Oct. 20, 1931.   C. E. EMERY   1,828,223
ILLUMINATED NUMBER PLATE FOR VEHICLES
Filed Jan. 10, 1930
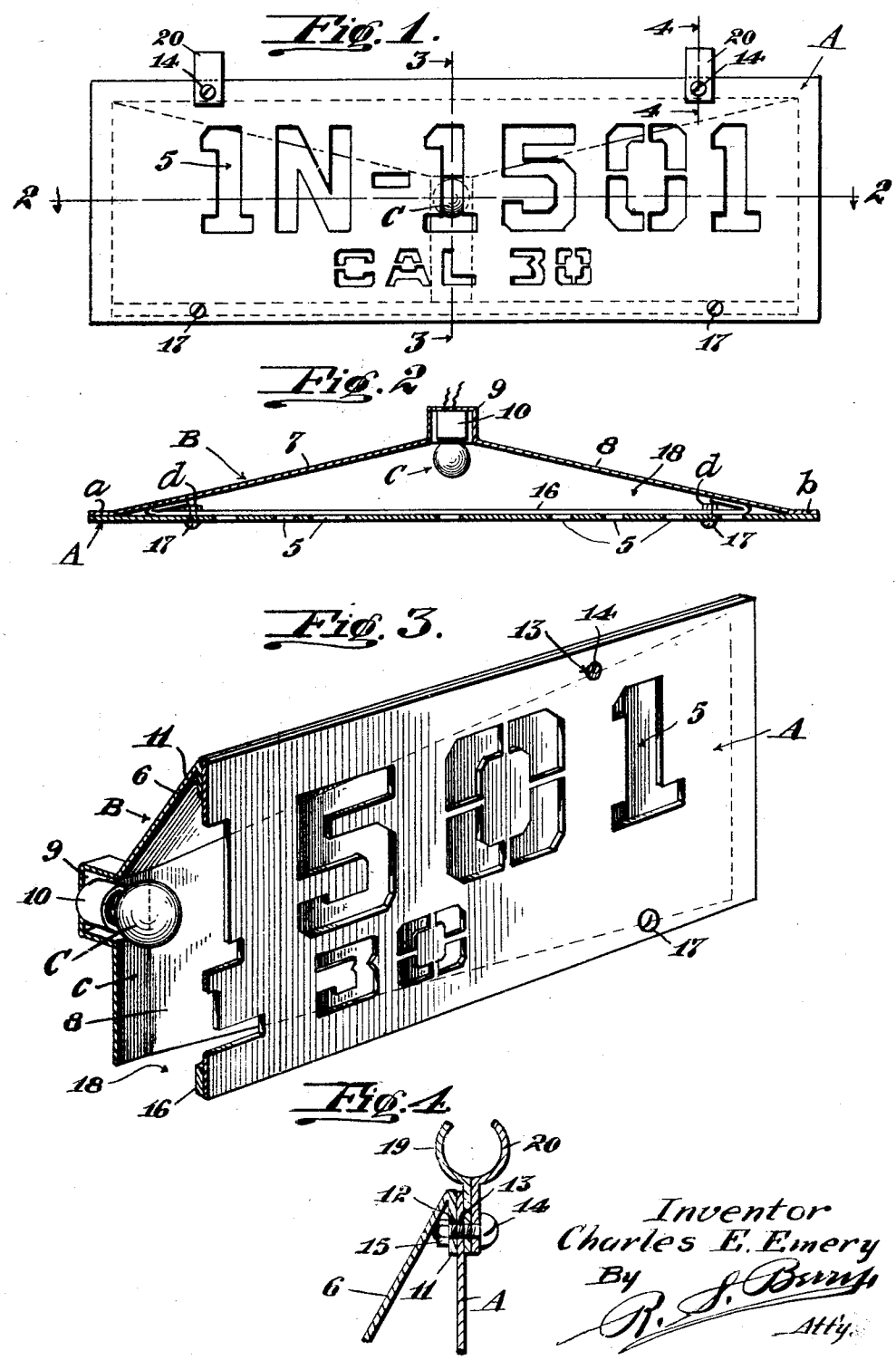
Inventor
Charles E. Emery
By
R. J. Bump
Atty.

Patented Oct. 20, 1931

1,828,223

UNITED STATES PATENT OFFICE

CHARLES E. EMERY, OF LOS ANGELES, CALIFORNIA

ILLUMINATED NUMBER PLATE FOR VEHICLES

Application filed January 10, 1930. Serial No. 419,810.

This invention relates to license-number plates for vehicles and has as its primary object the provision of a number plate which is adapted to be illuminated in such manner that the numbers and other indicia thereon will be rendered highly visible so that the numbers and indicia may be readily discerned at considerable distances and during movement of the vehicle to which it is applied.

Heretofore it has been the general practice to equip the front and rear ends of motor vehicles with license plates bearing embossed numbers and indicia colored in contrast with a background, the visibility of which is dependent solely on such light as may be reflected therefrom and, as a consequence, such license plates are practically invisible at night except when illuminated from extraneous sources of light. In some instances, the license plates on the rear of the vehicle is illuminated by light directed thereon from a vehicle tail-light but ordinarily no provision is made for illuminating the license plate on the front end of the vehicle. Under the present system, hit-and-run drivers frequently effect their escape because of the inability of observers to discern the identifying license-plate numbers and it is frequently necessary for traffic officers to stop motor vehicles at night in order to determine the license-plate number.

The present invention contemplates the illumination of the license plate in such an effective manner as to insure clear visibility of the numbers and indicia thereon after night, and to provide a construction which will minimize the possibility of the numbers and indicia on the plate being rendered invisible as by the accumulation of dust and dirt thereon.

With the foregoing objects in view, together with such other objects and advantages as may subsequently appear, the invention resides in the parts and in the combination, construction and arrangement of parts hereinafter described and claimed and illustrated by way of example in the accompanying drawings, in which:—

Fig. 1 is a view of the license plate as seen in front elevation;

Fig. 2 is a view in horizontal section as seen on the line 2—2 of Fig. 1;

Fig. 3 is a view in section and prospective as seen on the line 3—3 of Fig. 1;

Fig. 4 is a detail in section taken on the line 4—4 of Fig. 1 illustrating the manner of mounting the license plates.

Referring to the drawings more specifically, A indicates a face-plate which is here shown as rectangular in form but which obviously may be of any suitable outline, it being desirable to vary the shape of this face-plate in producing license plates for different states or periods of time.

In carrying out my invention, the face-plate A is formed with cut-out numbers or letters 5 in the manner employed in forming stencils, thus providing the plate with openings, the margins of which correspond in outline to the desired numbers or letters. The face-plate thus formed is disposed in front of a housing B in which is located a lamp C constituting a source of light; the lamp C being here shown as comprising the ordinary electric light bulb which is connected into an electric circuit in the usual manner and which serves as a means for illuminating the openings in the face-plate.

As a means for distributing the light throughout the area of the back of the face-plate extending over the housing B, the latter is formed with a downwardly and rearwardly inclined top wall 6 the end margins of which extend diagonally toward each other from the front to the rear margins thereof and which end margins intersect rearwardly diverging side and back walls 7 and 8, the forward ends of which side walls terminate adjacent the ends of the face-plate and are formed with marginal flanges $a$ and $b$ extending parallel with the face plate and against which the latter abut; the inner ends of the side and back walls 7 and 8 terminating adjacent the longitudinal center of the housing and being connected together through a wall portion $c$ extending parallel with the face plate. The walls 6, 7, 8 and $c$ are here shown as flat and their inner faces are formed to constitute reflective surfaces. The housing is formed at its center with a recess 9 in which is disposed a socket 10 in which the light globe C is mounted; the recess 9 being formed in the wall c. The upper margin of the top wall 6 of the housing is formed with a down-turned flange 11 which is provided with openings 12 arranged to register with openings 13 in the face-plate and through which openings are inserted bolts 14 fitted with nuts 15 whereby the face-plate is detachably affixed to the housing.

Where the face-plate is of such length as to necessitate further attaching thereof to the housing the latter is provided with a bar 16 the outer ends of which are inturned and are rigidly connected to the lower outer end portions of the side walls 7 and 8 to which bar the lower marginal portion of the face-plate is attached as by means of bolts 17 which are passed through registering openings in the face plate A and the bar 16 and engaged with nuts d. The lower margin of the walls 7, 8, and c terminate on a plane with a lower margin of the face plate and constitute the lower margin of the housing B. The space between the lower margin of the face-plate and the lower margin of the housing B is open so as to preclude the accumulation of dust or dirt within the housing; this opening, indicated at 18, serving to permit the discharge from the housing of such loose dust or dirt as may pass through the cut-outs or openings of the face-plate.

By the provision of the unobstructed opening 18 rearward of the face plate the openings in the face plate may be kept uncovered; the employment of a transparent covering for the openings in the face plate being rendered unnecessary. This obviates the use of coverings of glass and the like as heretofore employed in the art, and thereby dispenses with the costs incident to the initial provision of such covering as well as the possible replacement thereof and furthermore obviates objectionable weight thereof.

The license plate formed as above described may be mounted on the vehicle in any suitable manner but is here shown as fitted with a pair of clamping jaws 19 and 20 which are formed with stems 20 and 21 having registering openings therein adapted to be engaged by the bolts 14, which clamping jaws are adapted to be engaged with a bar or similar means of support affixed to the motor vehicle.

In the operation of the invention, illumination of the lamp C will direct light rays through the cut-outs or openings 5 in the face-plate thereby rendering the numbers or letters thereon highly visible, particularly after night.

In the application of the invention, it is desirable that the lamp C employed on the license plate affixed to the rear of the vehicle emit a red light while that employed on the front of the vehicle emit a green light.

By thus illuminating the license plate at the rear of the vehicle with a red light the usual tail-light may be dispensed with.

While I have shown and described a specific embodiment of my invention, I do not limit myself to the exact details of construction set forth but may employ such changes and modifications as occasion may require without departing from the spirit and scope of the invention as defined in the accompanying claim.

I claim:

A license plate for vehicles comprising a stenciled plate the openings of which are uncovered, a housing extending rearward of said plate including a flat downwardly inclined top wall and flat side walls converging toward each other from adjacent the ends of said stenciled plate, a lamp located in said housing between the contiguous ends of said side walls, said housing being open throughout on its under side, and means for detachably connecting said plate to said housing.

In witness whereof, I hereunto affix my signature.

CHARLES E. EMERY.